(12) United States Patent
McCroskey et al.

(10) Patent No.: US 9,791,278 B2
(45) Date of Patent: Oct. 17, 2017

(54) NAVIGATING WITH STAR TRACKING SENSORS

(71) Applicant: Honeywell International Inc., Morristown, NJ (US)

(72) Inventors: Robert C. McCroskey, Burnsville, MN (US); Wesley J. Hawkinson, Chanhassen, MN (US); Steven J. Sanders, Scottsdale, AZ (US); Lawrence Charles Vallot, Lake Elmo, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/865,709

(22) Filed: Sep. 25, 2015

(65) Prior Publication Data

US 2016/0282123 A1 Sep. 29, 2016

Related U.S. Application Data

(60) Provisional application No. 62/137,686, filed on Mar. 24, 2015.

(51) Int. Cl.
| | |
|---|---|
| *G01C 21/00* | (2006.01) |
| *G01C 21/02* | (2006.01) |
| *G01C 21/16* | (2006.01) |
| *B64G 1/36* | (2006.01) |

(52) U.S. Cl.
CPC ............ *G01C 21/165* (2013.01); *B64G 1/36* (2013.01); *G01C 21/005* (2013.01); *G01C 21/025* (2013.01)

(58) Field of Classification Search
None
See application file for complete search history.

(56) References Cited

U.S. PATENT DOCUMENTS

| | | | |
|---|---|---|---|
| 3,015,457 A * | 1/1962 | Dixson | G01C 21/165 244/175 |
| 3,048,352 A * | 8/1962 | Hansen | G01C 21/165 235/61 NV |
| 5,396,326 A | 3/1995 | Knobbe et al. | |

(Continued)

OTHER PUBLICATIONS

European Patent Office, "Extended European Search Report from EP Application No. 16159288.6 mailed Aug. 22, 2016", "from Foreign Counterpart of U.S. Appl. No. 14/865,709", Aug. 22, 2016, pp. 1-8, Published in: EP.

(Continued)

*Primary Examiner* — Rami Khatib
(74) *Attorney, Agent, or Firm* — Fogg & Powers LLC

(57) ABSTRACT

One embodiment is directed towards a method of navigating a body. The method includes determining a respective measured direction of each of a plurality of celestial objects with respect to the body based on an output of one or more star tracking sensors mounted to the body. Calculating an expected direction of at least one of the plurality of celestial objects with respect to the body based on a current navigation solution for the body. Calculating an updated navigation solution for the body based on the expected direction of the at least one celestial object, the measured direction of the plurality of celestial objects, and an output of one or more inertial sensors mounted to the body.

20 Claims, 2 Drawing Sheets

(56) References Cited

U.S. PATENT DOCUMENTS

| | | | |
|---|---|---|---|
| 5,809,457 A | 9/1998 | Yee et al. | |
| 6,272,432 B1 | 8/2001 | Li et al. | |
| 8,597,025 B2 | 12/2013 | Belenkii et al. | |
| 2006/0028550 A1* | 2/2006 | Palmer, Jr. | G08B 13/19619 348/155 |
| 2008/0046138 A1 | 2/2008 | Fowell et al. | |
| 2009/0177398 A1 | 7/2009 | Belenkii et al. | |

OTHER PUBLICATIONS

Willhite, "An Analysis of ICBM Navigation Using Optical Observations of Existing Space Objects", Jun. 2004, p. (s) 1-123, Publisher: Department of Aeronautics and Astronautics, Published in: US.

* cited by examiner

NAVIGATING WITH STAR TRACKING SENSORS

CROSS-REFERENCE TO RELATED APPLICATIONS

This application claims the benefit of U.S. Provisional Patent Application Ser. No. 62/137,686, filed on Mar. 24, 2015, which is hereby incorporated herein by reference.

BACKGROUND

Conventional celestial-aided navigation includes correcting for drift in inertial sensors. For example, conventional celestial aiding has been used to correct for yaw/heading and tilt errors in inertial measurements. This conventional celestial-aiding corrects for yaw/heading and tilt errors by measuring the angle between a star tracking sensor and a distant star. This measured angle can be provided to a navigation-solution to correct for errors in yaw/heading and tilt. Thus, this conventional celestial-aiding provides only attitude (i.e., not position) updates.

Other conventional celestial aiding has been used to provide position correction, however, this conventional celestial aiding requires highly precise alignment knowledge and stability between the celestial aid and the inertial sensors. The precise alignment and stability is required because the angle between the star tracking sensor and a distant star is translated to position based on the angle between the star tracking sensor and the local vertical axis. Since the local vertical axis is measured by the associated inertial measurement unit (IMU), the orientation between the star tracking sensor and the IMU must be known very precisely. Typically, such highly precise alignment and stability between the star tracking sensor and the IMU is achieved by mounting the star tracking sensor and the IMU in close proximity to the same platform so that the IMU moves (e.g., rotates) with the star tracking sensor.

SUMMARY

One embodiment is directed towards a method of navigating a body. The method includes determining a respective measured direction of each of a plurality of celestial objects with respect to the body based on an output of one or more star tracking sensors mounted to the body. Calculating an expected direction of at least one of the plurality of celestial objects with respect to the body based on a current navigation solution for the body. Calculating an updated navigation solution for the body based on the expected direction of the at least one celestial object, the measured direction of the plurality of celestial objects, and an output of one or more inertial sensors mounted to the body.

DRAWINGS

The following exemplary figures are intended to aid the understanding of the written description of the exemplary embodiments and should not be considered limiting in scope.

In accordance with common practice, the various displayed features are not necessarily drawn to scale but are drawn to emphasize specific features relevant to the exemplary embodiments.

DETAILED DESCRIPTION

Embodiments described herein provide for a navigation system that calculates an expected direction of a celestial object with respect to a body and uses the expected direction to aid in measuring the actual direction of the celestial object with respect to the body. The direction of the celestial object can then be used to determine the position of the body in a navigation system.

Figure 1:
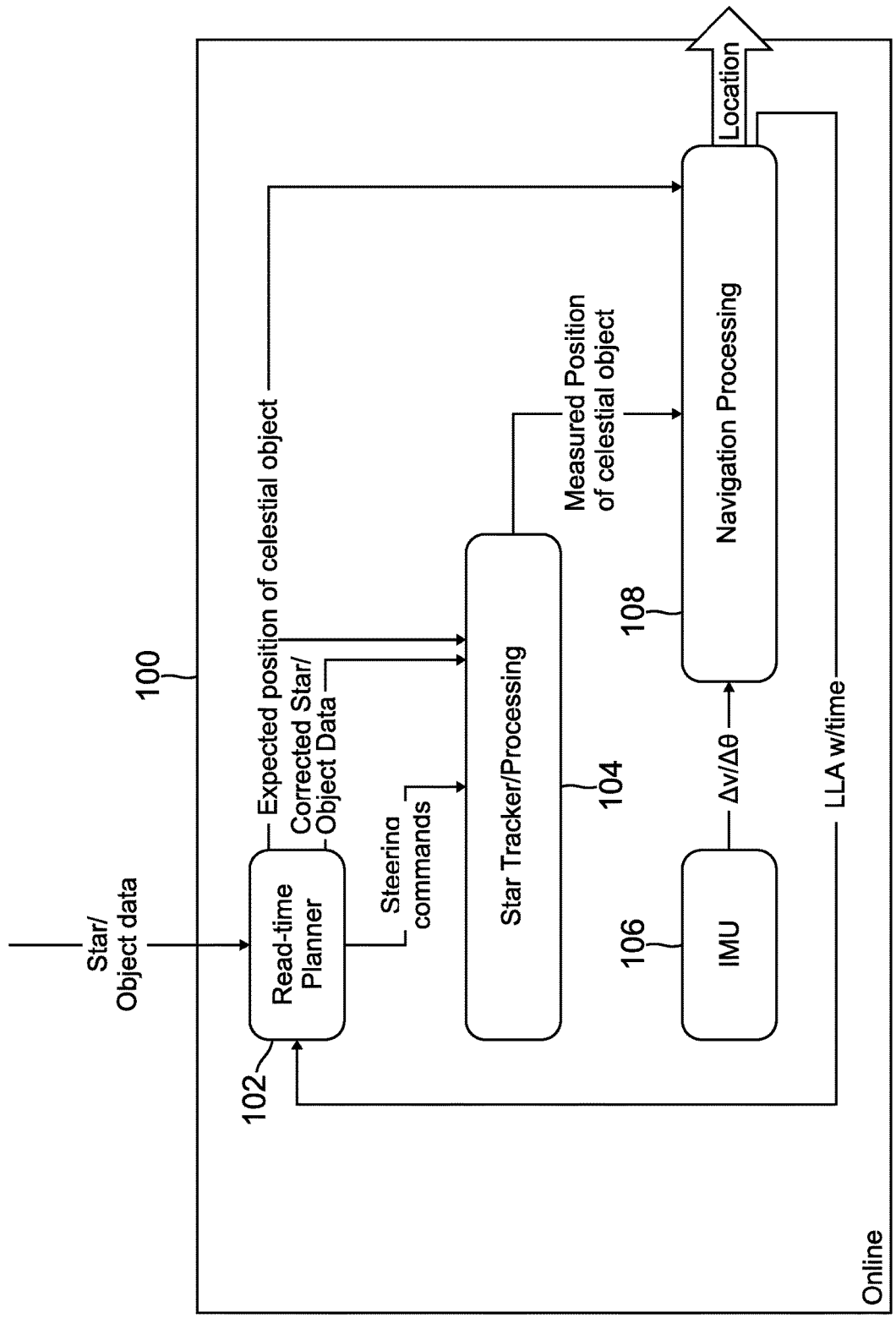
FIG. 1 is a functional block diagram of an example of a navigation system including a real-time planner and a star tracking module.

FIG. 1 is a functional block diagram of an example of such a navigation system 100. The navigation system 100 includes a real-time planner module 102, a star tracker module 104, one or more inertial measurement unit(s) (IMU(s)) 106, and a navigation solution module 108. Each module can be implemented with appropriate hardware and/or software components.

The navigation solution module 108 calculates a navigation solution for a body and outputs the navigation solution to one or more other systems (e.g., a guidance system for the body). The navigation solution can be calculated in any appropriate manner (e.g., with use of a Kalman-based filter) and can include any appropriate information such as a position, velocity, and attitude/heading for the body. The information in the navigation solution can be in any appropriate units such as latitude and longitude for position, meters-per-second for the velocity, and degrees for attitude/heading. The body can be any object including a manned or unmanned vehicle (e.g., spacecraft, aircraft, watercraft, land vehicle), robot, projectile, portable navigation system, or other mobile structure.

The real-time planner module 102 uses the navigation solution for the body to provide aiding information, such as beam-steering commands, to the star tracker module 104. The star tracker module 104 measures a direction of one or more celestial objects using one or more star tracking sensors. The measured direction is the direction of the one or more celestial objects with respect to the body (i.e., the body frame) as observed by the star tracker module 104. The star tracker module 104 can determine the measured direction in any appropriate manner, such as by determining which direction the sensor is pointing/facing, by measuring a physical movement of the one or more star tracking sensors as they move (e.g., rotate) to sense light from a celestial object, and/or by processing of image data obtained by the one or more star tracking sensors. For example, the direction in which the sensor is pointing can be determined from image data by comparison of the image data with a catalogue of the sky. Based on which area in the catalogue corresponds most closely with the image data, the direction in which the image data was taken from can be determined. The measured direction of the one or more celestial objects can be in any appropriate units such as in right ascension and declination with respect to the body.

As mentioned above, the star tracker module 104 can determine a measured direction of one or more celestial objects with respect to the body. The one or more celestial objects can include any object that is visible to the one or more star tracking sensors in the sky. Such a celestial object can include a star, planet, moon, or Earth satellite.

In an example, the star tracker module 104 can calculate a position of the body and provide the position to the navigation module 106 for use in correcting the position and/or velocity of the navigation solution. The position can be calculated based on known positions of a plurality of celestial objects and the measured direction to the plurality of celestial objects. The known positions of the plurality of celestial objects can be provided by the real-time planner 102 to the star tracker module 104. The star tracker module 104 can then measure the direction to each or a subset of the plurality of celestial objects. Based on the measured direction to multiple of the plurality of celestial objects, the star tracker module 104 can calculate angular difference between the multiple celestial objects from the perspective (i.e., position) of the body. Using this angular difference and the known position of the multiple celestial objects, the star tracker module 104 can calculate a position for the body. This position can be provided to the navigation solution module 108. In an example, the star tracker module 104 calculates at least three unique angular differences between respective celestial objects in order to calculate the position for the body. Advantageously, using the known position of multiple celestial objects and the angular difference between the multiple celestial objects enables the star tracker module 104 to calculate a position for the body without requiring highly precise alignment and stability between a star tracking sensor and corresponding inertial sensor as is required in conventional celestial-aided sensors. Accordingly, these techniques can enable the star tracking sensor to move independently from the corresponding inertial sensor.

The position calculated by the star tracker module 104 along with inertial measurements (e.g., acceleration and rate of rotation) from the IMU(s) 106 and data from any other navigation sensors, if present, can be provided to the navigation solution module 108. The navigation solution module 108 can calculate a navigation solution based on the position from the body from the star tracker module 104, the inertial sensor measurements, and the data from any other navigation sensors.

In an example, the navigation solution module 108 can then correct for errors in the position of the body based on the position calculated by the star tracker module 104. In an example, the navigation solution module 108 can correct for errors in the angular orientation calculated by the inertial sensors based on the position calculated by the star tracker module 104. The errors in the angular orientation can be calculated based on a system dynamics error model, a model of the propagation of the orientation errors into position errors, and the relative location of the inertial sensors with respect to the star tracking sensors.

The real-time planner 102 can provide other information to aid in the pointing/steering the star tracker module 104. The real-time planner 102 can determine this aiding information based on the current navigation solution (e.g., the navigation solution for the previous time step) calculated by the navigation solution module 108. The real-time planner 102 can also determine the aiding information based on reference data (star/object data) regarding the location (e.g., direction) of a celestial object in the sky. If the object moves relative to the celestial sphere, the reference data can also include information on the path of the object. The reference data can be stored locally with respect to the real-time planner module 102 and/or can be accessed or downloaded to the real-time planner module 102 from an external location. In an example, the real-time planner 102 can download a portion of reference data that corresponds to a known path, or set of possible paths, for the body, such as the reference data for celestial objects that will be visible during a planned route for the body.

In an example, the information provided to aid in pointing/steering star tracker module can include an expected direction for the celestial object. The real-time planner 102 can calculate the expected direction in which a celestial object should be with respect to the body based on the known location of the celestial object and the current navigation solution for the body. In the case of distant celestial objects (e.g., a star other than the sun), the distant celestial objects are essentially stationary such that the known direction of the celestial object is a single direction. In the case of moving celestial objects (e.g., an orbiting satellite), the direction of the celestial object can be calculated based on a known path of the object.

The expected direction of the celestial object can be used (e.g., by the star tracker module 104) to aid in determining a measured direction of the celestial object. In one implementation, the star tracker module 104 can steer at least one of the one or more star tracking sensors based on the expected direction of the celestial object. The star tracking module 104 can steer the at least one star tracking sensor such that the expected direction is within (e.g., generally centered within) the field-of-view of the at least one star tracking sensor. Such a use of the expected direction can reduce the length of time required to locate the celestial object by reducing or eliminating the amount of searching that is needed. In another implementation, the star tracker module 104 can identify the celestial object in an image from the one or more star tracking sensors based on the expected direction. The star tracking module 104 can do this by windowing the image to exclude portions of the image farther away from the expected direction or using other techniques to reduce the amount of searching needed to identify the celestial object in the image. The star tracking module 104 can also perform other processing techniques on the image such as excluding portions that are saturated or otherwise less beneficial (e.g., sun/moon in background or sky blocked by clouds). Such use of the expected direction can reduce the amount of processing and/or reduce the length of time used to identify the celestial object. In some implementations, the expected direction can be used to both steer the one or more star tracking sensors and to identify the celestial object in an image from the one or more star tracking sensors. The above uses of the expected direction of a celestial object can be beneficial in many circumstances such as if a celestial object is fast moving or dim to the one or more star tracking sensors.

In any case, the star tracking module 104 can identify the celestial object in an image(s) from the one or more star tracking sensors and determine its own direction (i.e., the measured direction) for the celestial object with respect to the body. Although the expected direction calculation and use has been described above with respect to a single celestial object, it should be understood that, in some examples, the expected direction of multiple celestial objects can be determined and used during a given time step of the navigation system.

In an example, the expected position of the celestial object can be provided to the navigation solution module 108 instead of, or in addition to, being provided to the star tracker module 104. In such an example, the navigation solution module 108 can calculate a difference between the expected direction and the measured direction of the celestial object and use this difference to improve the calculation of the navigation solution.

In an example, the real-time planner module 102 can provide information to aid in correcting for atmospheric effects on the measured direction of a celestial object. For example, if a celestial object is closer to the horizon, light from the object may be refracted which would result in an error between the measured direction of the celestial object and the true direction of the object. The real-time planner module 102 can calculate the error cause by atmospheric effects based on the known location of the celestial object and the current navigation solution for the body. The star tracker module 104 can then use the error information to adjust its measured direction for the celestial object. Similar to the expected direction, in some embodiments, the calculation and use of atmospheric errors can be performed for multiple celestial objects during a given time step of the navigation system.

In an example, the real-time planner module 102 can provide information to aid in correcting for stellar aberration effects on the measured direction of a celestial object. For example, if the velocity vector of the celestial object is significant relative to the body, stellar aberration can affect the measured direction. The real-time planner module 102 can calculate the error caused by stellar aberration (classical and/or relativistic) based on the velocity vector of the current navigation solution for the body. The star tracker module 104 can then use the error information to adjust its measured direction for the celestial object. The calculation and use of stellar errors can be performed for multiple celestial objects during a given time step of the navigation system. Additionally, in some embodiments both an adjustment for atmospheric error and an adjustment for stellar aberration to the measured direction can be performed for one or more (e.g., all) of the measured directions.

In an example, the real-time planner module 102 can select one or more celestial objects for the star tracker module 104 to measure the direction of. Such a selection can be made based on, for example, the resulting geometry of the set of the directions for multiple celestial objects (e.g., a set of celestial objects having a good or optimal dilution of precision). The selection can be made based on ease of identifying the celestial objects. The selection can also be made based on weather conditions such as clouds and/or sun obscuring or degrading visibility of one or more objects. The selection can also be made by the relative size of the object and/or distance to the object. Another selection criteria can be whether the object is in motion relative to the Earth and the direction of such motion, if any. In some examples, multiple such criteria as well as other criteria can be factored together to arrive at the selection.

Using the direction of one or more celestial objects the navigation system 100 (e.g., the navigation solution module 108) can determine an attitude for the body. In some examples, the star tracker module 104 can measure a path of a moving celestial object (e.g., an Earth satellite) with respect to a measured direction of a stationary celestial object (e.g., distant star). For example, angular rate of change of a satellite can be measured and used to determine a velocity and/or attitude for the body. A velocity can be determined by time resolving a difference in location of the satellite over time from the perspective of the star tracking sensor. Such a calculation can be based on angles-only navigation methods. The navigation system 100 can then determine a position of the body based on the relationship between the measured path of the moving celestial object, the known path of the moving celestial object, the measured direction of the stationary celestial object, and the known location of the stationary celestial object.

Figure 2:
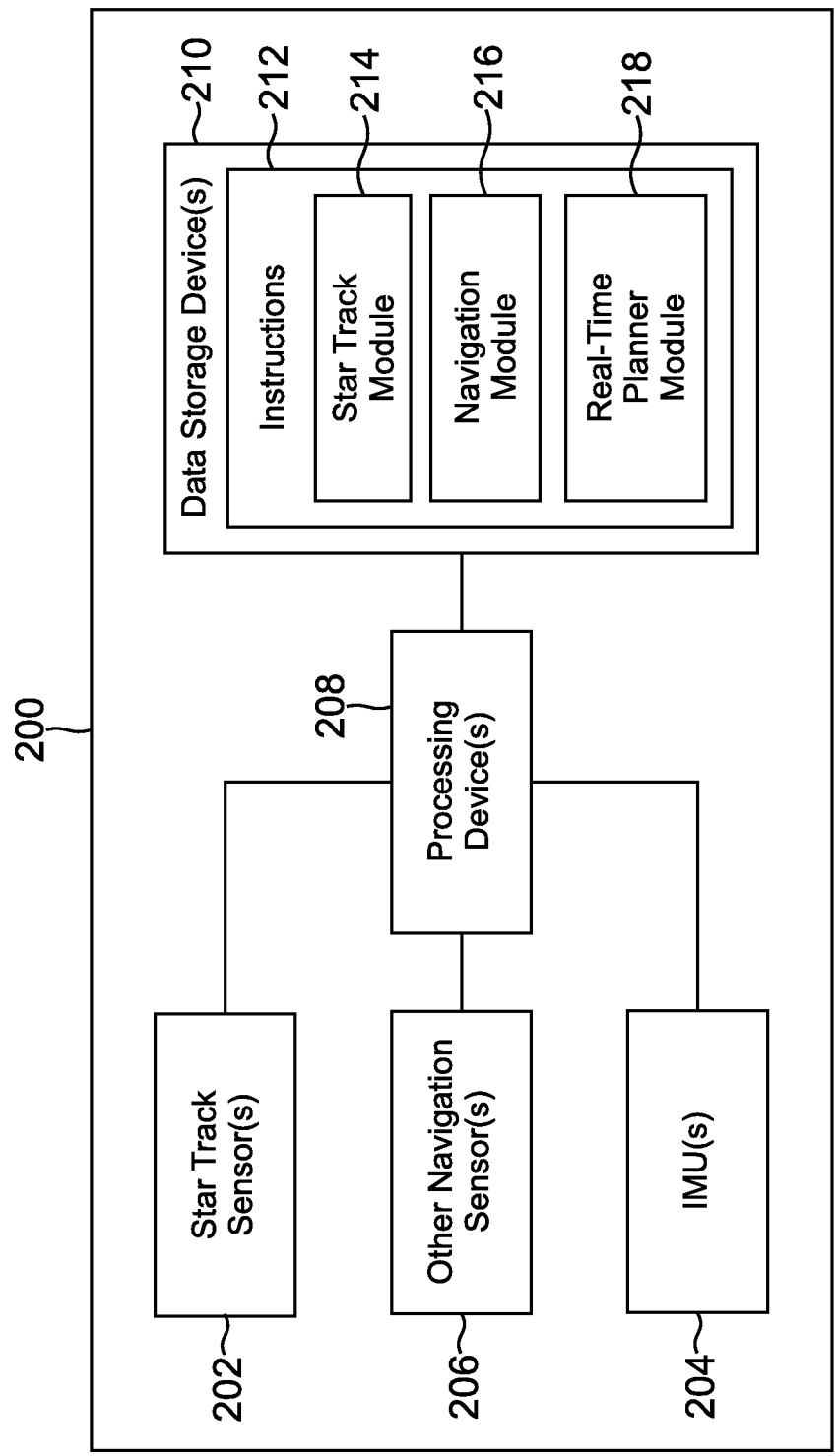
FIG. 2 is a block diagram of example hardware and software components that can be used to implement the navigation system of FIG. 1.

FIG. 2 is a block diagram of an example navigation system 200 illustrating hardware and software components that can be used to implement the functionality described above. The navigation system 200 includes one or more star tracking sensors 202 mounted on the body and configured to sense light from one or more celestial objects and to determine a direction from which such light is received. In an example, the one or more star tracking sensors 202 include an optical camera. In some examples, the star tracking sensors 202 include appropriate actuators to physically steer the star tracking sensors 202 in order to orient the field-of-view of the sensors as desired. The navigation system 200 also includes one or more inertial sensors (e.g., IMUs) 204 mounted to the body and configured to sense inertial motion of the body. The one or more inertial sensors can include a plurality of accelerometers and gyroscopes configured to sense three-dimensional acceleration and three-dimensional rotation of the body. In some examples, the one or more additional navigation sensors 206 can also be mounted to the body and are configured to provide additional navigation-related data. Such an additional navigation sensor can include a global navigation satellite system (GNSS) (e.g., GPS, GLONASS, Galileo, and Beidou) receiver, terrain-recognition system, pressure (e.g., barometric) sensor, Doppler velocity sensor, magnetometer, and/or other sensor.

The navigation system 200 also includes one or more processing devices 208 coupled to the one or more star tracking sensors 202, one or more inertial sensors 204, and one or more additional navigation sensors 206. The one or more processing devices 208 can include any suitable processing device such as a digital signal processor (DSP), central processing unit (CPU), micro-controller, arithmetic logic unit (ALU), or field programmable gate array (FPGA). The one or more processing devices 208 can be coupled to memory (not shown) such as RAM, as well as one or more data storage devices 210. The one or more data storage devices 210 can comprise any suitable processor readable media and can be permanently installed within the navigation system 200 or can be a removable device. Suitable processor readable media include flash drives (e.g., a USB stick or solid-state drive), magnetic disk drive (e.g., hard drive), ROM, optical disk (e.g., CD, DVD, Blu-ray), and others.

The one or more data storage devices 210 include instructions 212 which, when executed by the one or more processing devices 208, cause the one or more processing devices 208 to implement the functionality of the real-time planner module 102, the star track module 104, and the navigation solution module 108 described above. In an example, the instructions 212 can include star track module instructions/algorithms 214, a navigation solution module 216, and a real-time planner module 218 to implement this functionality.

EXAMPLE EMBODIMENTS

Example 1 includes a navigation system for a body comprising: one or more star tracking sensors mounted to the body; one or more inertial sensors mounted to the body; one or more processing devices coupled to the one or more star tracking sensors and the one or more inertial sensors; one or more memory devices coupled to the one or more processing devices, the one or more memory devices including instructions which, when executed by the one or more processing devices, cause the one or more processing devices to: determine a respective measured direction of each of a plurality of celestial objects with respect to the body based on an output of the one or more star tracking sensors; calculate an expected direction of at least one of the plurality of celestial objects with respect to the body based on a current navigation solution for the body; and calculate an updated navigation solution for the body based on the expected direction of the at least one celestial object, the respective measured directions of the plurality of celestial objects, and an output of the one or more inertial sensors.

Example 2 includes the navigation system of Example 1, wherein the instructions cause the one or more processing devices to use the expected direction of the at least one celestial object to aid in determining the measured direction for the at least one celestial object.

Example 3 includes the navigation system of Example 2, wherein use the expected direction of the at least one celestial object includes steer at least one of the one or more star tracking sensors based on the expected direction such that the expected direction is within the field of view of the at least one star tracking sensor.

Example 4 includes the navigation system of any of Examples 2-3, wherein use the expected direction of the at least one celestial object includes windowing an output of the one or more star tracking sensors based on the expected direction.

Example 5 includes the navigation system of any of Examples 1-4, wherein the instructions cause the one or more processing devices to select the plurality of celestial objects from a larger number of celestial objects in order to optimize the navigation accuracy that can be obtained from the resulting direction measurements.

Example 6 includes the navigation system of any of Examples 1-5, wherein the current navigation solution is a navigation solution determined by the navigation system for a previous time step.

Example 7 includes the navigation system of any of Examples 1-6, wherein the instructions cause the one or more processing devices to calculate an error in a measured direction of the at least one celestial object caused by one or more of atmospheric effects or stellar aberration on the light from the celestial object; and adjust the measured direction for the at least one celestial object based on the error.

Example 8 includes the navigation system of any of Examples 1-7, wherein each of the plurality of celestial objects includes one of a star, planet, Earth satellite, or moon.

Example 9 includes a method of navigating a body, the method comprising: determining a respective measured direction of each of a plurality of celestial objects with respect to the body based on an output of one or more star tracking sensors mounted to the body; calculating an expected direction of at least one of the plurality of celestial objects with respect to the body based on a current navigation solution for the body; and calculating an updated navigation solution for the body based on the expected direction of the at least one celestial object, the measured direction of the plurality of celestial objects, and an output of one or more inertial sensors mounted to the body.

Example 10 includes the method of Example 9, comprising using the expected direction of the at least one celestial object to aid in determining the measured direction of the at least one celestial object.

Example 11 includes the method of Example 10, wherein using the expected direction of the at least one celestial object includes steering at least one of the one or more star tracking sensors based on the expected direction such that the expected direction is within the field of view of the at least one star tracking sensor.

Example 12 includes the method of any of Examples 10-11, wherein using the expected direction of the at least one celestial object includes windowing an output of the one or more star tracking sensors based on the expected direction.

Example 13 includes the method of any of Examples 9-12, comprising selecting a plurality of celestial objects in which to measure the direction of, wherein the plurality of celestial objects are selected in order to optimize the navigation accuracy that can be obtained from the resulting direction measurements.

Example 14 includes the method of any of Examples 9-13, wherein the current navigation solution is a navigation solution determined by the navigation system for a previous time step.

Example 15 includes the method of any of Examples 9-14, comprising calculating an error in a measured direction of the at least one celestial object caused by one or more of atmospheric effects or stellar aberration on the light from the celestial object; and adjusting the measure direction based on the error.

Example 16 includes the method of any of Examples 9-15, wherein each of the plurality of celestial objects includes one of a star, planet, Earth satellite, or moon.

Example 17 includes a non-transitory processor-readable medium having processor-executable instructions stored thereon which, when executed by one or more processing devices, cause the one or more processing devices to: determine a measured direction of each of a plurality of celestial objects with respect to the body based on an output of one or more star tracking sensors mounted to the body; calculate an expected direction of at least one of the plurality of celestial objects with respect to the body based on a current navigation solution for the body; and calculate an updated navigation solution for the body based on the expected direction of the at least one celestial object, the measured direction of the plurality of celestial objects, and an output of one or more inertial sensors mounted to the body.

Example 18 includes the non-transitory processor-readable medium of Example 17, wherein the instructions are configured to steer at least one of the one or more star tracking sensors based on the expected direction such that the expected direction is within the field of view of the at least one star tracking sensor.

Example 19 includes the non-transitory processor-readable medium of any of Examples 17-18, wherein the instructions are configured to window an output of the one or more star tracking sensors based on the expected direction.

Example 20 includes the non-transitory processor-readable medium of any of Examples 17-19, wherein the instructions are configured to calculate an error in a measured direction of the at least one celestial object caused by atmospheric effects or stellar aberration on the light from the celestial object; and adjust the measure direction based on the errors.

The invention claimed is:

1. A navigation system for a body comprising:
   one or more star tracking sensors mounted to the body;
   one or more processing devices coupled to the one or more star tracking sensors;
   one or more memory devices coupled to the one or more processing devices, the one or more memory devices including instructions which, when executed by the one or more processing devices, cause the one or more processing devices to:
   determine a measured direction of each of a plurality of celestial objects with respect to the body based on an output of the one or more star tracking sensors;

wherein at least one of the celestial objects is a moving celestial object having a known path;

calculate an expected direction of at least one of the plurality of celestial objects with respect to the body based on a navigation solution for the body; and calculate an updated navigation solution for the body based on the path of the at least one celestial objects that is a moving celestial object, and differences between the measured directions of the plurality of celestial objects.

2. The navigation system of claim 1, wherein the instructions cause the one or more processing devices to use the expected direction of the at least one celestial object to aid in determining the measured direction for the at least one celestial object.

3. The navigation system of claim 2, wherein use the expected direction of the at least one celestial object includes steer at least one of the one or more star tracking sensors based on the expected direction such that the expected direction is within a field of view of the at least one star tracking sensor.

4. The navigation system of claim 2, wherein use the expected direction of the at least one celestial object includes windowing an output of the one or more star tracking sensors based on the expected direction.

5. The navigation system of claim 1, wherein the instructions cause the one or more processing devices to select the plurality of celestial objects that are celestial objects that will be visible along a path of the body in order to optimize the navigation accuracy that can be obtained from resulting direction measurements.

6. The navigation system of claim 1, wherein the navigation solution is a navigation solution that was last previously determined by the navigation system before calculating the updated navigation solution.

7. The navigation system of claim 1, wherein the instructions cause the one or more processing devices to calculate an error in a measured direction of the at least one celestial object caused by one or more of atmospheric effects or stellar aberration on the light from the celestial object; and adjust the measured direction for the at least one celestial object based on the error.

8. The navigation system of claim 1, wherein each of the plurality of celestial objects includes one of a star, planet, Earth satellite, or moon.

9. A method of navigating a body, the method comprising:
determining a measured direction of each of a plurality of celestial objects with respect to the body based on an output of one or more star tracking sensors mounted to the body, wherein at least one of the celestial objects is a moving celestial object having a known path;

calculating an expected direction of at least one of the plurality of celestial objects with respect to the body based on a navigation solution for the body; and calculating an updated navigation solution for the body based on the path of the at least one celestial objects that is a moving celestial object, and differences between the expected directions and measured directions of the plurality of celestial objects.

10. The method of claim 9, comprising using the expected direction of the at least one celestial object to aid in determining the measured direction of the at least one celestial object.

11. The method of claim 10, wherein using the expected direction of the at least one celestial object includes steering at least one of the one or more star tracking sensors based on the expected direction such that the expected direction is within a field of view of the at least one star tracking sensor.

12. The method of claim 10, wherein using the expected direction of the at least one celestial object includes windowing an output of the one or more star tracking sensors based on the expected direction.

13. The method of claim 9, comprising selecting a plurality of celestial objects in which to measure the direction of, wherein the plurality of celestial objects are selected in order to optimize the navigation accuracy that can be obtained from resulting direction measurements.

14. The method of claim 9, wherein the navigation solution is a navigation solution that was last previously determined by the navigation system before calculating the updated navigation solution.

15. The method of claim 9, comprising calculating an error in a measured direction of the at least one celestial object caused by one or more of atmospheric effects or stellar aberration on the light from the celestial object; and adjusting the measure direction based on the error.

16. The method of claim 9, wherein each of the plurality of celestial objects includes one of a star, planet, Earth satellite, or moon.

17. A non-transitory processor-readable medium having processor-executable instructions stored thereon, configured to:
determine a measured direction of each of a plurality of celestial objects with respect to the body based on an output of one or more star tracking sensors mounted to the body, wherein at least one of the celestial objects is a moving celestial object having a known path;

calculate an expected direction of at least one of the plurality of celestial objects with respect to the body based on a navigation solution for the body; and calculate an updated navigation solution for the body based on the path of the at least one celestial objects that is a moving celestial object, and differences between the expected directions and measured directions of the plurality of celestial objects.

18. The non-transitory processor-readable medium of claim 17, wherein the instructions are configured to steer at least one of the one or more star tracking sensors based on the expected direction such that the expected direction is within a field of view of the at least one star tracking sensor.

19. The non-transitory processor-readable medium of claim 17, wherein the instructions are configured to window an output of the one or more star tracking sensors based on the expected direction.

20. The non-transitory processor-readable medium of claim 17, wherein the instructions are configured to calculate an error in a measured direction of the at least one celestial object caused by atmospheric effects or stellar aberration on the light from the celestial object; and adjust the measured direction based on the errors.

* * * * *